2,338,645

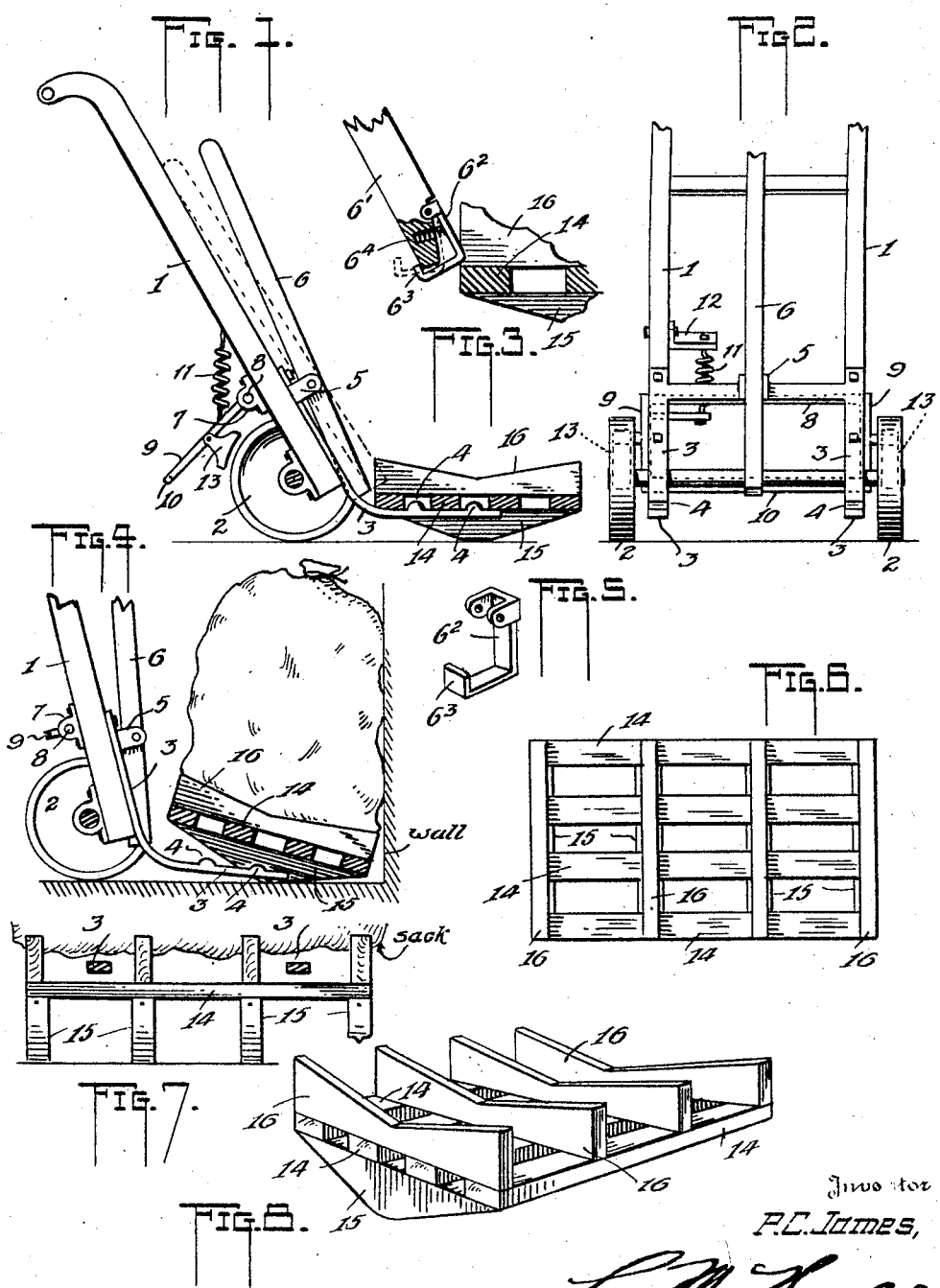
Jan. 4, 1944. P. C. JAMES 2,338,645
TRUCK AND ARTICLE CARRIER STRUCTURE ASSEMBLY
Filed June 21, 1943
Inventor
P. C. James,
By L. M. Thurlow
Attorney Patented Jan. 4, 1944

UNITED STATES PATENT OFFICE 2,338,645

TRUCK AND ARTICLE CARRIER STRUCTURE ASSEMBLY

Perry C. James, Peoria, Ill.

Application June 21, 1943, Serial No. 491,698

10 Claims. (Cl. 214—65.4)

This invention pertains to a truck and article carrier structure and assembly.

More particularly the invention has to do with a tiltable hand truck and a carrier or cradle for sacked goods, although applicable for the handling of any type of goods such as crated or boxed articles.

As is well known, it is particularly difficult to lift and transfer by hand to a truck such articles as bagged and sacked goods such as seed, vegetables and other produce due to bulk and weight, and especially since the sacked contents constantly shift in such containers. Due to these difficulties much time is lost in transferring the goods from one point to another coupled with the laborious lifting by hand and great strain upon the worker.

With the above in view it is my object to furnish a type of truck together with a carrier or cradle for use therewith that will relieve the strain on the worker considerably while facilitating handling and saving much time in manipulating a given quantity of the goods.

To the end that the invention may be fully understood in all its details, the appended drawing is provided forming part thereof wherein:

Figure 1 is a side elevation of my truck together with a carrier or cradle, parts of which latter are shown in section;

Figure 2 is a front elevation of the truck;

Figure 3 is a detail of a modification of a control lever adjacent the cradle, the whole being produced upon a larger scale than the earlier figures;

Figure 4 is a side elevation of the truck and cradle, both being shown in different positions from the position illustrated in Figures 1 and 2;

Figure 5 shows in perspective a latch-member or dog forming part of the structure in Figure 3;

Figure 6 is a plan of the cradle;

Figure 7 is a side elevation of said cradle, and

Figure 8 shows the cradle in perspective.

In Figures 1, 2 and 4 the numeral 1 designates the frame members of a hand truck supported on the usual wheels 2. Affixed to each of the members is a lifting and weight-supporting foot portion 3 whose free extremities extend downwardly and forwardly of the truck and each preferably provided with a pair of spaced cross ribs 4 on its upper surface.

Pivoted between its ends upon a suitable support 5 fixed with respect to the truck is a control hand-lever 6 adapted to swing in the direction of truck travel.

Rockably mounted in suitable bearings 7 on each frame member 1 is a shaft 8 having at each end a depending arm 9 carrying a cross-rail 10 to serve as a brake treadle, a spring 11 at one end being in control of the named structure, the other end of such spring having attachment to a fixed part such as an arm 12, for example, carried by a truck member 1, see Figure 2. A brake-shoe 13 is attached to each arm 9 adapted to engage an adjacent wheel 2.

The forwardly extending foot portions 3 are arranged and adapted to engage and to have full control of the cradle heretofore referred to, this said cradle being shown in all the figures of the drawing except Figures 2 and 5. In the present instance this comprises a rectangular structure including a series of long parallel spaced strips 14 constituting a platform supported on two or more spaced rocker-members 15 best shown in Figures 1, 4 and 8 each rocker-member lying in planes at right angles to the greatest measurement of the named strips. These rocker-members are spaced to permit the entrance between any two of them and one of the foot portions 3 as indicated in Figure 4 although this may be readily understood as well in a study of Figures 1 and 4.

It is noted that the rocker-members 15 support the strips in this instance only on a straight surface so that all the said strips lie in one plane, and that midway of the lengths the end surfaces of the said members 15 approach each other in straight lines at opposite angles downwardly and thus terminate the members each in a lowest point substantially midway the width of the cradle so that said cradle is unstable and may, therefore, fall in either direction by rocking at the said lowest point of said rocker-members, see Figure 4.

Upstanding from and crossing the strips 14 while affixed thereto, are two or more spaced parallel load-supporting members 16 these being downwardly slanted at their upper edges toward each other forming, collectively, a safe and stable lodgement for an article to be received and transported, such as a filled bag or sack as in Figure 4, for example, though boxed goods may be loaded as well. Yet, of course, the members 16 may not be employed, merely using the platform made up of the strips 14.

In the figure last named it is noted that the loaded sack may have either been unloaded from the truck, or it may be about to be loaded thereon.

If the sack has been unloaded it is observed that it is influenced in its position of lodgement against the wall by having been tipped upon the flat end edges of the rocker member where the deposited load will lie safely and permanently until wanted.

If on the other hand the sack is to be loaded from the position named the truck is moved so that the foot members 3 enter between the rocker-members. Upon depressing the truck frame member 1 the foot-member 3 will be lifted against the strips 14, the cross-ribs 4 naturally entering between any two strips as the sack and cradle are rocked and drawn toward, against, and upon the truck. It is noted in Figures 1 and 4 that the hand lever 6 at the time of loading has been moved to hold its lower extremity out of the path of travel of the cradle as the latter is swung toward the worker. Having completed the loading operation the lever 6 may now be swung to the position shown in broken lines in Figure 1 and thus full control of the load is had.

The convenience and advantage of the rockable cradle is at once evident. Since the rocker-members have straight faces where they rest upon the floor, the load is positively and permanently placed either when resting on the floor or upon the truck. In the latter location, of course, the fixed position is assisted by the lever 6 and the ribs 4.

During the loading act the truck is prevented from movement on its wheels by depressing the brake structure to engage the brake shoes 13 with said wheels.

By the application of wheel control in this manner perfect control of the loading is positive and injury to the workman is avoided.

The upstanding members 16 while serving to support the load serve another purpose in that since they are arranged in spaced relation they admit of holding the loaded sacks or other form of article at a high position or a position spaced above the strips 14 and therefore, on occasion, the foot-members 3 may be introduced between such strips and lifted free thereof, this being done as suggested in Figure 7. Such procedure would, of course, as viewed in said Figure 7, require that the truck be raised high enough to admit such introduction.

In Figure 3 is shown a modified form of the control lever, which in this said figure is denoted by 6'. The lower extremity of this member 15 is cut away at an angle downwardly and rearwardly and a latch or dog 6² is pivotally hung upon said lever, said latch having the form of the letter J whose upturned extension 6³ is normally held against the rear side of said lever due to spring 6⁴, carried by the lever in this instance, and exerting pressure against said latch. This form of lever may be used in lieu of the lever 6. Where in the movement of the lever to carry its extremity over the edge of the cradle as in Figure 1, dotted lines, the placement of the cradle is at fault so that the lever 6 would not best answer. The latch 6² of the lever 6' permits free operation since the said latch will yield and permit the lever to swing, whereupon said latch acts as the abutment portion as would the end of the lever 6 under ordinary conditions.

Again, when loading the truck, as in Figure 4 when the mounted load is swung toward the worker suppose that the lever 6' is in use. In lowering the cradle that member, if it strikes the latch, will push the same aside whereupon said latch will return to normal position as in Figure 3 locking the cradle positively.

While the cradle is preferably of the general form and construction shown it may perhaps be changed in form while retaining the rockable type of supporting members 15, and preferably of the opposed flat under edges rather than curved of the conventional type. While I have shown a particular form of the rocker-portion of the cradle it is clear that the unstable effect may be otherwise attained.

I claim:

1. In combination with a truck having a forwardly extended foot-member to engage beneath a load to be lifted, a load carrying cradle consisting of a single member comprising a platform, spaced rocker members to rest upon a supporting surface and supporting said platform, the under surface of each of the members upwardly receding in opposite directions from a position substantially at the middle of the lengths of said members toward said platform creating an unstable structure and to permit the cradle to rock and permit it to have opposite positions of rest, the platform in either extreme of cradle movement being spaced from the supporting surface to permit entrance beneath it of the said foot-member of the truck.

2. In combination with a truck having a forwardly extended foot-member to engage beneath a load to be lifted, and having a rib upstanding therefrom, a load carrying cradle consisting of a single member including a supported platform adapted to receive the rib in seated engagement therewith, said cradle including spaced rocker members to rest upon a supporting surface and supporting said platform, the under surface of each of the members upwardly receding in opposite directions from a position substantially at the middle of the lengths of said members to said platform creating an unstable structure and to permit the cradle to rock and permit it to have to different positions of rest, the platform in either extreme of cradle movement being spaced from the supporting surface to permit entrance beneath it of the said foot-member of the truck.

3. In combination with a truck having a forwardly extended foot-member to engage beneath a load to be lifted, a load carrying cradle consisting of a single member comprising a platform having upstanding members each having a recess of V outline, and having spaced rocker members to rest upon a supporting surface and supporting said platform, the under surface of each of the rocker members upwardly receding in opposite directions from a position substantially at the middle of the lengths of those members toward said platform creating an unstable structure and to permit the cradle to rock to two extreme positions of rest, the platform in either of such extreme positions being spaced from the supporting surface to permit entrance beneath it of the said foot-member of the truck.

4. The combination of a wheeled truck frame having a forwardly extended foot-member provided with an upstanding rib, a cradle including a platform adapted to receive the foot-member and rib beneath it in seated relation fixing the foot-member and platform relatively, and a lever pivoted on the truck frame in position to be swung over the top of the cradle in position to engage the same when mounted on said foot-member, said rib and said lever effectively securing said cradle in load carrying position.

5. The combination with a truck having a forwardly extending foot-member with an upstanding rib, of a cradle consisting of a single unit comprising a platform adapted for receiving the said rib in positive engagement therewith at the under side thereof when the cradle is mounted on said foot-member, said cradle also consisting of spaced rocker members to rest upon a supporting surface, and supporting said platform, the under surface of each of the rocker members upwardly receding in opposite directions from substantially the middle of the lengths of said members toward the platform creating an unstable structure for permitting the cradle to rock to opposite extremes of movement and rest, the platform being spaced from the supporting surface in either such extreme position to permit entrance of the foot-member beneath it and the engagement of the rib therewith, and a lever pivoted on the truck frame in position to be swung over the cradle at the top edge thereof to engage it, and with said rib adapted to stabilize the cradle.

6. The combination of a wheeled truck frame having a forwardly extending foot-member provided with a raised rib, a lever pivoted on the frame swingable in a forward direction, and a cradle beneath which the foot-member is adapted to pass, said cradle having a recess to receive said rib into it from below, said lever adapted to be swung over said cradle to engage upon the same at a position higher than the position of said rib, said lever and rib acting jointly to fix the cradle positively relative to said foot member and a rocking member for said cradle as its support, said member having two opposed floor containing surfaces each upwardly inclined from a middle position toward opposite extremities of said cradle adapted to permit the latter to rock in a direction paralleling the direction of travel of said truck frame, said surfaces being substantially straight from said middle position to the extremes thereof.

7. The combination with a truck frame, supporting wheels therefor, and a foot-member extending from said frame forwardly for receiving an object to be lifted, of a lever pivotally mounted on the frame tiltable in the direction of truck travel, said lever at one extremity extending to a position near the position of the object being lifted, and a latch pivoted to the lever distant from the immediate extremity thereof adapted to swing relative to said lever in the same plane therewith, the lever being formed to permit said swing, and a spring in control of the latch to hold it elastically in a given normal position, and means to limit the movement imparted to said latch by said spring.

8. A cradle for the purpose described comprising in its construction a platform, and a pair of spaced apart members beneath, attached to, and supporting said platform above a supporting surface upon which the said members rest, said members at their supported edges having the form of a V whose point or angle portion lies in a position substantially midway of the width of the platform and most distant therefrom creating an unstable support for the structure, the straight companion surfaces of the two members adapted to abut upon the supporting surface to stabilize said structure in either of the tilted positions of the same.

9. A load carrying cradle including in its construction a platform, a pair of spaced rocker members lying crosswise of a supporting said platform, the same each having two surfaces each inclined away from one end thereof and away from said platform to a point distant from the latter and joining each other at said point substantially midway of the lengths of such members, said surfaces being substantially straight throughout, and spaced load supporting members lying crosswise of the platform upon the surface thereof opposite the surface having the said rocking members, the said load supporting members each having two surfaces at the load supporting edge inclined one toward the other and inclined toward said platform and toward a position near the middle of the width thereof.

10. A load carrying cradle including in its construction a platform of spaced members, a pair of spaced rocker-members lying crosswise of and supporting said platform, said rocker members each having two surfaces each inclined away from one end of the same and away from the platform to a point distant from the latter and joining each other at said point, and spaced upstanding members lying crosswise of the platform on the opposite side thereof from that having the rocker member.

PERRY C. JAMES.